March 14, 1939.  M. C. ROGERS ET AL  2,150,750
SULPHURIC ACID RECOVERY
Filed Dec. 5, 1936
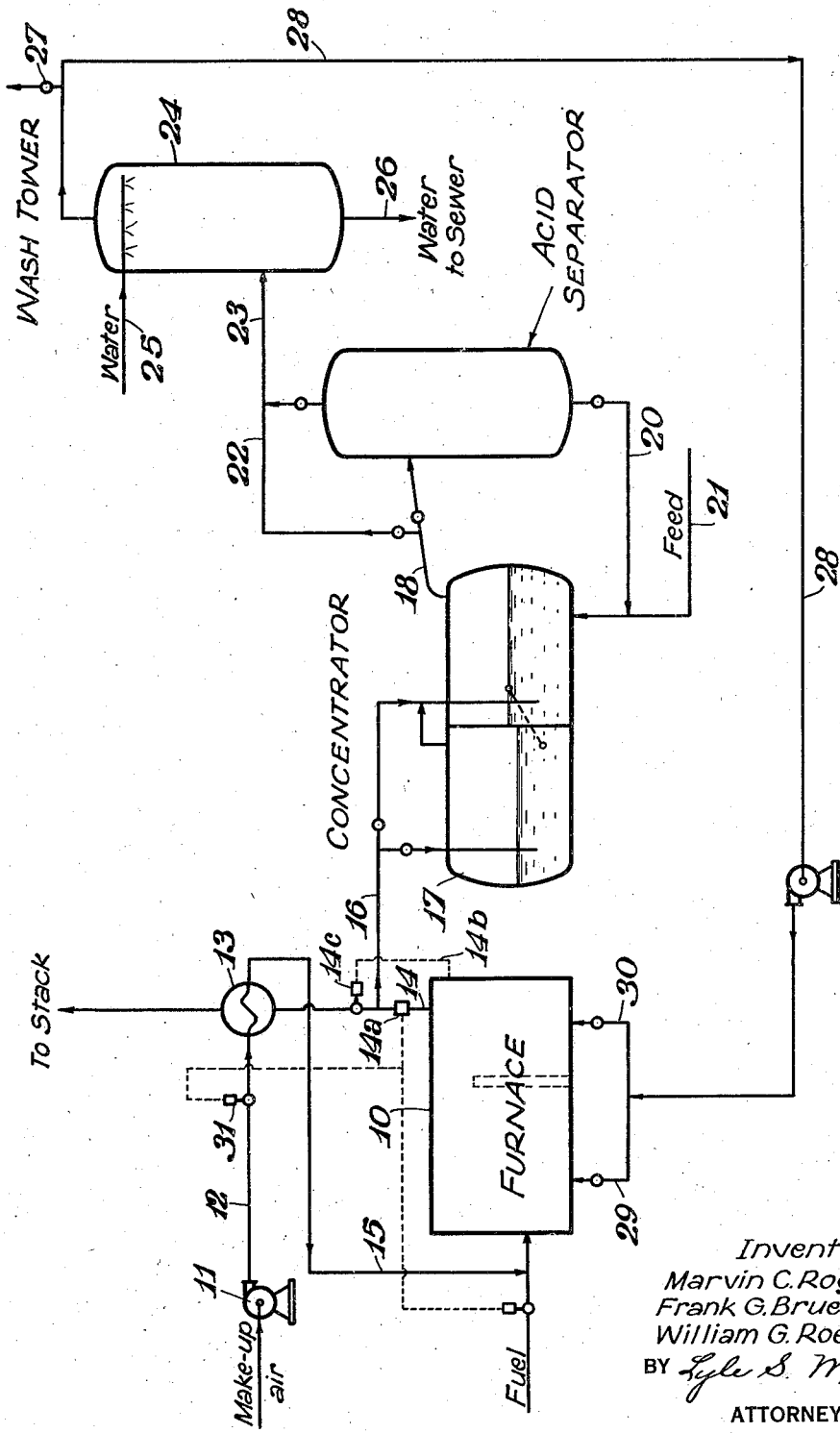
Inventors:—
Marvin C. Rogers
Frank G. Brueckmann
William G. Roesch
BY Lyle S. Motley
ATTORNEY Patented Mar. 14, 1939

2,150,750

UNITED STATES PATENT OFFICE 2,150,750

SULPHURIC ACID RECOVERY

Marvin C. Rogers, Frank G. Brueckmann, and Willard G. Roesch, Hammond, Ind., assignors to Standard Oil Company, Chicago, Ill., a corporation of Indiana Application December 5, 1936, Serial No. 114,346

6 Claims. (Cl. 23—171)

The present invention relates to the art of concentrating sulphuric acid and pertains more particularly to a process for concentrating sulphuric acid wherein the so-called acid nuisance usually incident to such concentrating operations is greatly reduced.

It is an object of the present invention to provide a process for concentrating sulphuric acid wherein only a small fraction of the stream of gases being passed through the concentrator is exhausted to the atmosphere as distinguished from known processes, wherein the entire stream of gases passing through the concentrator are subsequently exhausted to the atmosphere.

It is an object of the present invention to provide a process for concentrating sulphuric acid wherein the gases passing through the concentrator are recycled through a heating zone to reduce the sulphur trioxide contained therein to sulphur dioxide, and subsequently venting only a fraction of the total stream of gases to the atmosphere, recycling the remaining portion through the acid concentrator.

The drawing shows diagrammatically an arrangement of apparatus for carrying out our improved process.

In the broad aspect of our invention we contemplate the recycling of at least a portion of the gases which have been passed through the body of acid. These gases, comprising entrained sulphur trioxide, sulphur dioxide and other gases, are again passed through the furnace zone where the heat is maintained sufficiently high to reduce the sulphur trioxide to sulphur dioxide. A small fraction of this stream of gas leaving the furnace is vented to the atmosphere, the remaining fraction being recycled to the concentrating zone. In this way we eliminate venting sulphur trioxide to the atmosphere, as well as materially reducing the total quantity of gases passing to the stack.

In the arrangement of apparatus shown in the drawing for carrying out our improved process, it will be seen that we burn fuel in a furnace 10 to which is supplied air under pressure. The air is delivered by a blower 11 through a conduit 12 to a heat exchanger 13. The incoming air is here heated by the exhaust gases passing from the furnace 10 through a suitable conduit 14 communicating with the heat exchanger 13. The heat exchanger 13 is shown diagrammatically only, and may in actual practice be of the Ljungstrom type or comprise a plurality of tubes in the convection section or back pass of the furnace 10. The incoming make-up stream of air is passed from the heat exchanger through a conduit 15 to the combustion zone of the furnace 10, where it is employed together with a suitable supply of fuel for effecting combustion within the furnace. The hot gases of combustion are passed from the furnace through a conduit 14 to a point where the stream is divided, the smaller fraction of the stream being passed through the aforementioned heat exchanger 13 for imparting heat directly to the incoming stream 12, thence to the stack; the greater portion of the stream leaving the furnace is directed by way of a branch conduit 16 into the concentrator 17 and passed into contact with the body of acid to be concentrated. The gases from the concentrator, containing water of evaporation, entrained sulphur trioxide, sulphur dioxide, and other gases, are passed through a conduit 18 into an acid separating zone, which may comprise the conventional form of separator vessel or a Cottrell precipitator. The acid which precipitates in the separator may be conducted by way of a conduit 20 to a point communicating with the feed line 21 leading to the concentrator or otherwise disposed of as particular circumstances may indicate.

Under certain circumstances it may be desired to dispense with the separator and we have indicated a by-pass conduit 22 having suitable valve means therein. The stream of gases is next passed by way of a conduit 23 to a water removal zone which is shown as comprising a vessel 24 into the lower portion of which the said gases are introduced. A supply of water is introduced through a conduit 25 into the upper portion of the vessel and passed counter-current to the gases, as by spraying, for precipitating the water therein; the water from the wash tower may be carried through a conduit 26 to the sewer or to suitable water reconditioning means.

At least a portion of the dehydrated gases from the wash tower are recycled through the aforementioned steps, as distinguished from known arrangements wherein gases are vented to the atmosphere. We provide vent means 27 for venting a small fraction of the gases leaving the dehydrator to the stack; however, we prefer to carry the entire stream of dehydrated gases through a conduit 28 back to the furnace 10 and then vent a portion of the gases to the stack. We have shown the conduit 28 leading to the furnace as being divided into two branches, one branch 29 being introduced into the combustion zone and the second branch 30 being introduced into the back pass of the furnace. Suitable valve means are provided in each branch line for determining the distribution of the recycled gases, thus effecting a more perfect control over the temperature within the furnace.

The temperature in the furnace is maintained sufficiently high to reduce the sulphur trioxide in the recycled stream to sulphur dioxide and oxygen. We have found that temperatures from 1000 to 3000° F. are satisfactory for converting sulphur trioxide but we prefer to operate the furnace in the neighborhood of 1800° F.

We propose to vent in the neighborhood of thirty per cent of the total stream of recycled gas to the stack, recycling approximately two-thirds; however, various fractions from ten to sixty per cent may be vented with success. We introduce through the above mentioned line 12 only sufficient make-up air to take the place of the gases vented to the stack and to furnish the necessary oxygen for combustion.

We show a thermal responsive device 14a in the line 14 for controlling the air supply line 12 through the valve 31 and for controlling the fuel line through the valve 31a. A line 14b is provided for by-passing gas from the furnace in response to a predetermined pressure on a valve 14c. Valve 14c is normally set for venting a definite percentage of the total flow of gas as above described.

It will thus be seen that we have provided a process for concentrating sulphuric acid wherein the gases leaving the concentrator instead of being vented to the atmosphere in the form of nuisance (as is the case in known processes) these gases are recycled to the furnace and subjected to sufficient heat to remove the nuisance and then only a small portion of the gas is vented to the atmosphere the remaining greater portion being recycled through the body of acid.

Since many different embodiments of our invention may be made without departing from the spirit thereof, it is to be understood that we do not limit ourselves to the foregoing description further than as indicated in the following claims.

We claim:

1. A process for concentrating sulphuric acid comprising heating a stream of gases in a furnace zone, passing the greater portion of the heated stream of gases into contact with a body of acid in a concentrating zone, passing at least a portion of the stream of gases from said concentrating zone to a water removal zone, said last named stream comprising entrained water removed from the acid, entrained sulphur trioxide, sulfur dioxide, and other gases, removing at least the major portion of the water from said gases, recycling at least a portion of said dehydrated gases to said heating zone, maintaining the temperature in said heating zone sufficiently high to reduce substantially all of the sulphur trioxide to sulphur dioxide and oxygen, venting a small portion of the gases leaving the furnace to the stack, and recycling the greater portion again through said concentrating zone.

2. A process for concentrating sulphuric acid comprising heating a stream of gases in a furnace zone, passing the greater portion of the heated stream of gases into contact with the body of acid in a concentrating zone, passing at least a portion of the stream of gases from said concentrating zone to a water removal zone, said last named stream comprising entrained water removed from the acid, entrained sulphur trioxide, sulphur dioxide and other gases, removing at least the major portion of the water from said gases, reheating at least a portion of said dehydrated gases to a temperature sufficient to convert sulphur trioxide to sulphur dioxide and oxygen, venting a small portion of the resulting stream, and recycling the greater portion thereof again through said concentrating zone, said vented portion of said stream being employed to heat by indirect heat exchange make-up air to take the place of the exhausted gases.

3. A process for concentrating sulphuric acid comprising heating a stream of gases in a furnace zone, passing the greater portion of the heated stream of gases into contact with a body of acid in a concentrating zone, passing at least a portion of the stream of gases from said concentrating zone to a water removal zone, said last named stream comprising entrained water removed from the acid, entrained sulphur trioxide, sulphur dioxide, and other gases, removing at least the major portion of the water from said gases, recycling at least a portion of said dehydrated gases again to said furnace, introducing said gases into said furnace in two streams, a first stream passing into the combustion zone, and a second stream passing directly into the convection zone, maintaining a sufficient over all temperature in said furnace to reduce sulphur trioxide to sulphur dioxide and oxygen, passing a small fraction of the total stream of gases leaving the furnace through a heat exchanger to preheat the incoming make-up air, and hence to the stack, and recycling the remaining portion of the stream of gases from the furnace, through said acid concentrating zone.

4. A process for concentrating sulphuric acid comprising heating a stream of gases in a furnace zone, passing the greater portion of the heated stream of gases into contact with a body of acid in a concentrating zone, passing at least a portion of the stream of gases from said concentrating zone to an acid separating zone, said last named stream comprising entrained water removed from the acid, entrained sulphur trioxide, sulphur dioxide, and other gases, precipitating a portion of the entrained acid in said separating zone, passing said gases from said separating zone to a water removal zone and removing at least the major portion of the water from said gases, recycling at least a portion of said dehydrated gases to said furnace zone, maintaining the temperature in said furnace zone sufficiently high to reduce substantially all of the sulphur trioxide to sulphur dioxide and oxygen, venting a small portion of the gases leaving the furnace to the stack, and recycling the remaining portion of the gases from the furnace through said concentrating zone.

5. An apparatus for concentrating sulphuric acid comprising a furnace having a combustion zone and a convection zone, an acid concentrator adapted to contain a body of acid, a source of air under pressure, means associated with said combustion zone and utilizing said source of air for burning fuel therein, means for removing the flue gases from said furnace, means for dividing said flue gases into a first stream and a second stream, means for transferring heat from said first stream to said source of air and then exhausting said first stream to the atmosphere, means for passing said second stream into said acid concentrator in contact with said body of acid, means for removing the gases from said acid concentrator, means for dehydrating said gases from said concentrator, means for introducing a portion of said dehydrated gases into said combustion zone, and means for introducing another portion of said dehydrated gases into said convection zone.

6. An apparatus for concentrating sulphuric acid comprising a furnace, an acid concentrator adapted to contain a body of acid, a source of air under pressure, means associated with said combustion zone and utilizing said source of air for burning fuel therein, means for removing the flue gases from said furnace, means for dividing said flue gases into a first stream and a second stream, means for transferring heat from said first stream to said source of air and then exhausting said first stream to the atmosphere, means for passing said second stream into said acid concentrator in contact with said body of acid, means for removing the gases from said acid concentrator, means for dehydrating said gases from said concentrator, and means for returning said dehydrated gases to said furnace for admixture with the flue gases therein.

MARVIN C. ROGERS.
FRANK G. BRUECKMANN.
WILLARD G. ROESCH.